(12) United States Patent
Jzuhsiag

(10) Patent No.: US 6,747,633 B2
(45) Date of Patent: Jun. 8, 2004

(54) WIRELESS MOUSE RECHARGE SYSTEM

(75) Inventor: Yen Jzuhsiag, Chung Ho (TW)

(73) Assignee: Chic Technology Corp., Taipei Hsien (TW)

( * ) Notice: Subject to any disclaimer, the term of this patent is extended or adjusted under 35 U.S.C. 154(b) by 43 days.

(21) Appl. No.: 09/993,482

(22) Filed: Nov. 27, 2001

(65) Prior Publication Data

US 2002/0118172 A1 Aug. 29, 2002

(30) Foreign Application Priority Data

Feb. 23, 2001 (TW) .................................. 90104125 A

(51) Int. Cl.⁷ ................................................ G09G 5/08
(52) U.S. Cl. ...................................... 345/163; 345/156
(58) Field of Search ................................. 345/156, 157,
345/158, 161, 163, 164, 165, 166, 167,
168, 169, 173, 1.1, 2.3, 3.1, 211; 320/114,
111, 134, 136

(56) References Cited

U.S. PATENT DOCUMENTS 4,578,674 A * 3/1986 Baker et al. ................. 345/159
4,754,268 A * 6/1988 Mori ........................... 345/163
5,049,863 A * 9/1991 Oka ............................ 345/163
5,349,282 A * 9/1994 McClure ..................... 320/136
5,809,449 A * 9/1998 Harper ......................... 702/63
5,886,686 A * 3/1999 Chen ........................... 345/168
5,920,178 A * 7/1999 Robertson et al. .......... 320/114
6,035,350 A * 3/2000 Swamy et al. ................ 710/73
6,064,177 A * 5/2000 Dixon ......................... 320/111
6,219,037 B1 * 4/2001 Lee ............................. 345/167
6,282,303 B1 * 8/2001 Brownlee ................... 382/124
6,498,458 B1 * 12/2002 Chen ........................... 320/114
2002/0061739 A1 * 5/2002 Nakamura et al. .......... 455/343

* cited by examiner

*Primary Examiner*—Xiao Wu
(74) *Attorney, Agent, or Firm*—Bacon & Thomas, PLLC

(57) ABSTRACT

A wireless mouse recharge system includes a recharge body, an indicating light and a recharger. The recharge body is found inside the mouse, is connected to a receptacle found at the outer edge of the shell and can be inserted to any power source. The indicating light is visible through the transparent roller at the front section of the mouse and indicates different statuses of the recharge body. The recharger is equipped with a plug, a power connecting wire, and a transformer plug, therefore enabling wireless to emit signals without having to change batteries.

3 Claims, 1 Drawing Sheet

WIRELESS MOUSE RECHARGE SYSTEM

TECHNICAL RANGE

The present invention relates to a wireless mouse recharge system, and especially to one with a recharge system for a wireless mouse.

INVENTION BACKGROUND

Commonly used wireless mice are very easy to use as they do not possess any signal wire, and are gradually replacing wired mice which cannot be connected to a power source and need a battery source in order to emit a signal. However, it is quite inconvenient for the user to change new batteries in case of low power and hence, much improvement is needed to obviate this drawback.

Most wireless mice, as mentioned above, are usually designed with an indicating light to notify the user of remaining power status and as soon as the light dies out, new batteries have to be changed immediately. It is therefore quite impossible for the user to get any advanced signal and do any preparations. Hence, in order to comply with the advanced technical progress and capability of today's computers, it is an object of the present invention to obviate such drawback and make necessary improvements.

Apart from the recharging method mentioned above, other relative recharge methods can also be used. For example, for signal receptors with a recharge stand, plugs can be found at both ends of a power connecting wire such that one end is inserted to the mouse receptacle and the other end to the receptacle of a signal receiver. Hence, mouse devices with the present invention system can also be directly recharged.

SUMMARY OF INVENTION

The present invention relates to a wireless mouse recharge system designed with a recharge battery wherein the user can make continuous use of the mouse without having to change used batteries in case of low power.

The present invention relates to a wireless mouse recharge system designed with an indicating light notifying the user of battery status and other situations.

The present invention relates to a wireless mouse recharge system wherein the recharge body can be connected to a power source by means of a transformer or a receiver.

The present invention relates to a wireless mouse recharge system wherein the indicating light can indicate thirteen different recharging statuses notifying the user of power conditions.

NUMERATION

Figures 1, 2:
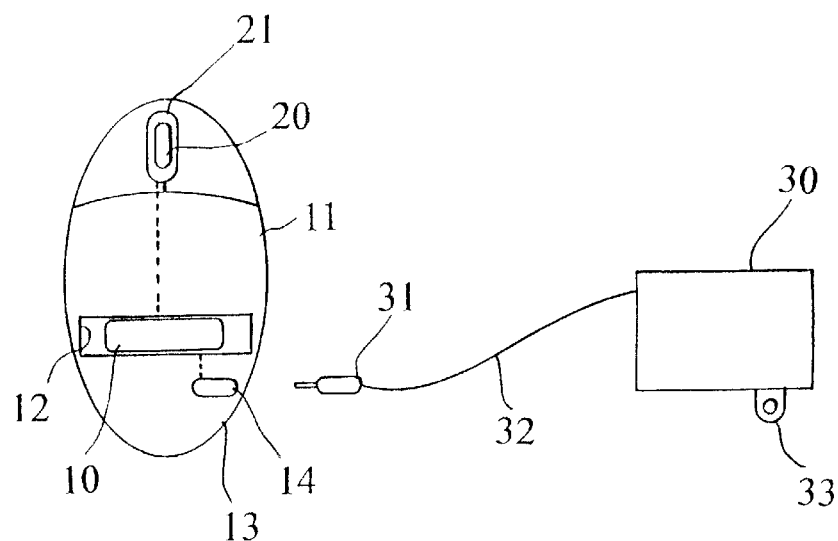
FIG. 1 shows a view of the present invention.
FIG. 2 shows a table of the indicating light status.

10—recharge body 11—mouse 12—cavity 13—outer shell 14—receptacle 20—indicating light 21—transparent roller 30—recharger 31—plug 32—power connecting wire 33—transformer plug 50—low battery 51—recharger inserted 52—LED 61—no power 62—unrecharged 63—unlightened 71—power on 72—unrecharged 73—lightened when in use 81—no power 82—recharged 83—regular lighting 91—power on 92—recharged 93—regular lighting 94—high lighting when in use

MODE FOR CARRYING OUT INVENTION

With reference to FIG. 1 showing a view of the present invention, a recharging body 10 and indicating light 20 are connected to a recharger 30, wherein recharge body 10 is found inside the cavity of 12 of the mouse 11 and is connected to the receptacle 14 found in the outer shell 13 of the mouse 11, and so that the mouse 11 can be connected to any power source. The indicating light 20 is positioned so as to he visible through the transparent roller 21 at the front section of the mouse and indicates different statuses of the recharge body 10. The recharger 30, as shown in the diagram, is equipped with a plug 31, a power connecting wire 32 and a transformer plug 33. The mouse 11 can be recharged at any time by means of the plug 33. In particular, the mouse 11 can be recharged at any time by inserting the plug 31 of the recharge body into the receptacle 14 of the mouse 11 and simultaneously inserting the transformer plug 33 into any household receptacles.

FIG. 2 shows a table of the indicating light status, a low battery 50 status, recharger-inserted 51 status, and LED (indicating light) 52 status. The low battery 50 status relates to the mouse 11 power source supplying the LED with needed power. Recharger-inserted 51 status relates to recharger 30 being inserted into receptacle 14 of mouse 11 and being recharged. LED 52 status relates to lighting or high lighting of the light-emitting diode. Other statuses shown in the diagram are read horizontally as follows: battery low 61—not charging 62—unlightened 63—, battery charged 71—not charging 72—lightened when in use 73, battery low 81—charging 82—regular lighting 83, battery charged 91—charging 92—and regular lighting 93 or high lighting when in use 94. The status "not lighted when in use", "regular lighting", and "high lighting" notify the user of remaining power for the next use. The mouse can thus be pre-recharged or recharged while in use and is thus very practical as there are no interruptions in order to change batteries.

What is claimed is:

1. A wireless mouse recharge system comprising a recharge body, a transparent roller, an indicating light, and a recharger, wherein:

said recharge body is found inside the mouse, includes a rechargeable battery, and is connected to a receptacle found at the outer edge of the shell;

light from said indicating light is visible through the transparent roller at the front section of the mouse and indicates different statuses of the recharge body; and said recharger is equipped with a plug for insertion into the receptacle, a power connecting wire, and a transformer plug for insertion into the power supply, said recharger being arranged to supply power from the power source to the recharge body, and therefore to the battery, wherein the indicating light provides an indication of low battery conditions and whether the recharger is charging the battery, including the following status indications:

battery low—not charging—unlighted;
battery charged—not charging—regular lighting when in use;
battery low—charging—regular lighting;
battery charged—charging—regular lighting or high lighting when in use, wherein the statuses "not lighted when in use", "regular lighting", and "high lighting" notify the user of remaining power for a next use; and wherein the mouse can thus be pre-charged or recharged while in use without interruptions in order to change batteries.

2. A wireless mouse recharge system as claimed in claim 1, wherein said recharge body comprises rechargeable batteries.

3. A wireless mouse recharge system as claimed in claim 1, wherein the receptacle of said recharge body is arranged to be connected to a general household power source by the transformer plug, power connecting wire, and plug, or connected to a receptacle power source of a wireless mouse signal receiver.

* * * * *